March 19, 1957 R. H. McELROY 2,785,455
APPARATUS FOR WORKING CLAY-LIKE MATERIALS
Filed April 7, 1953 3 Sheets-Sheet 1
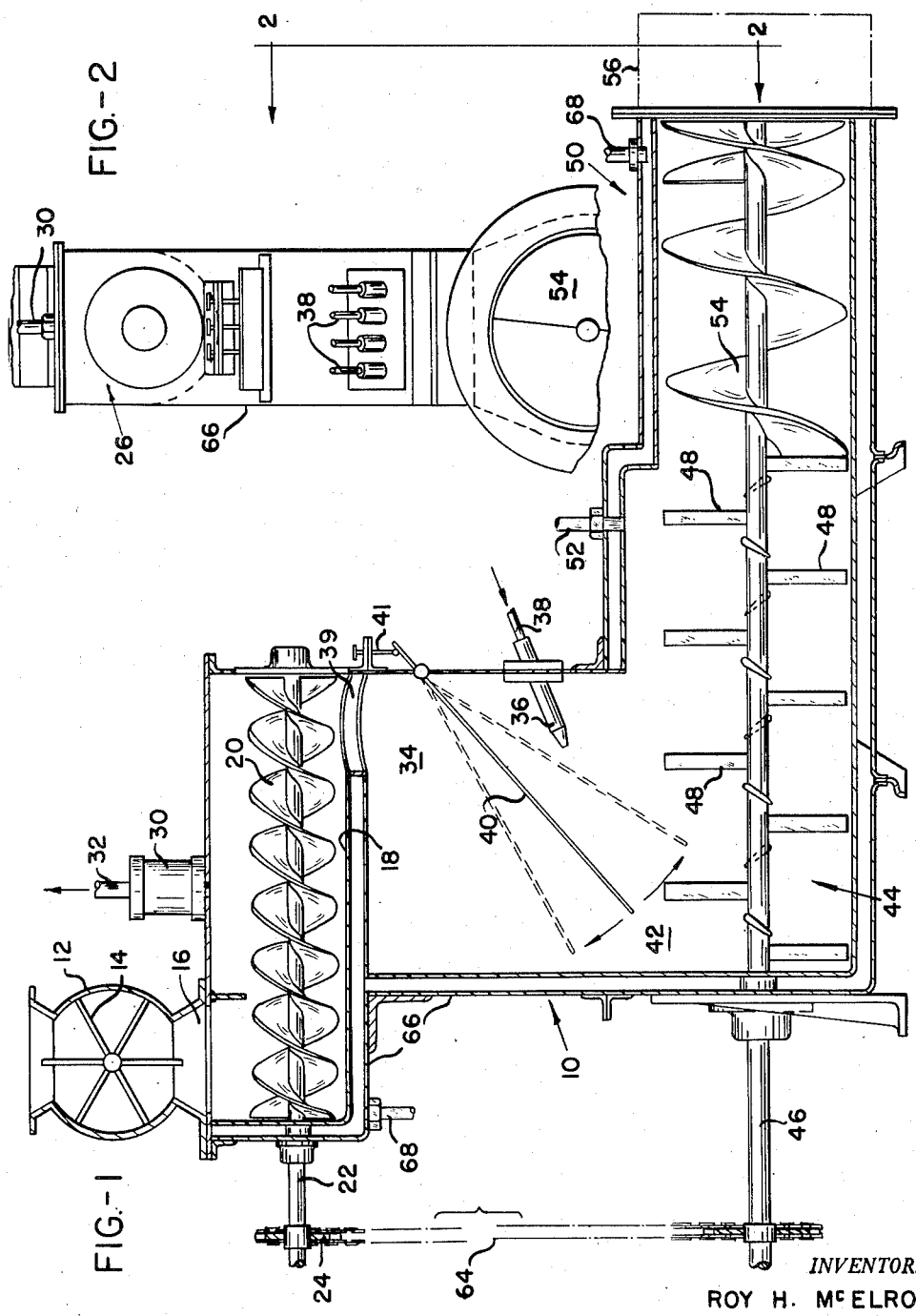
INVENTOR.
ROY H. McELROY
BY Toulmin & Toulmin
ATTORNEYS

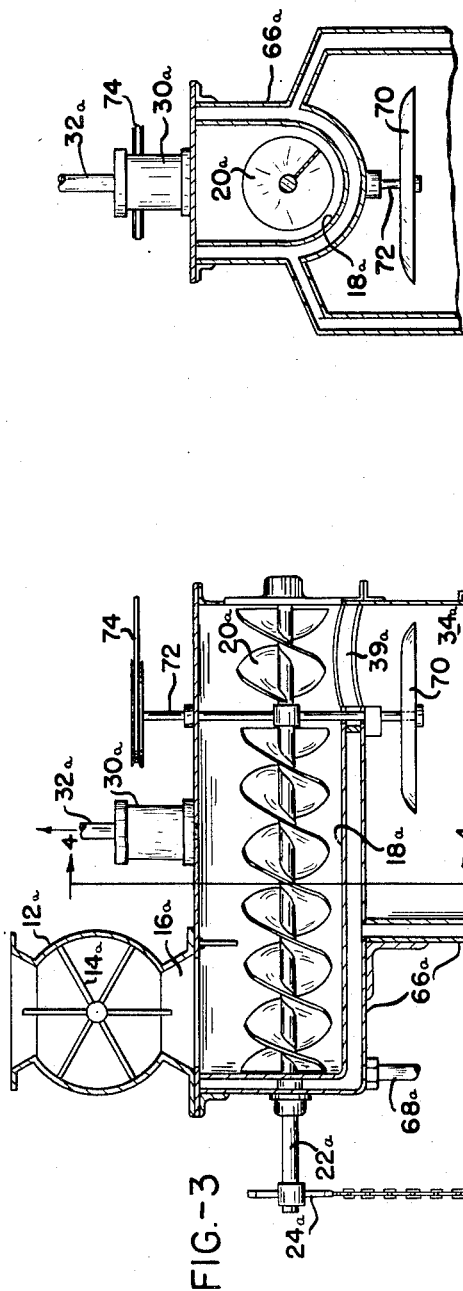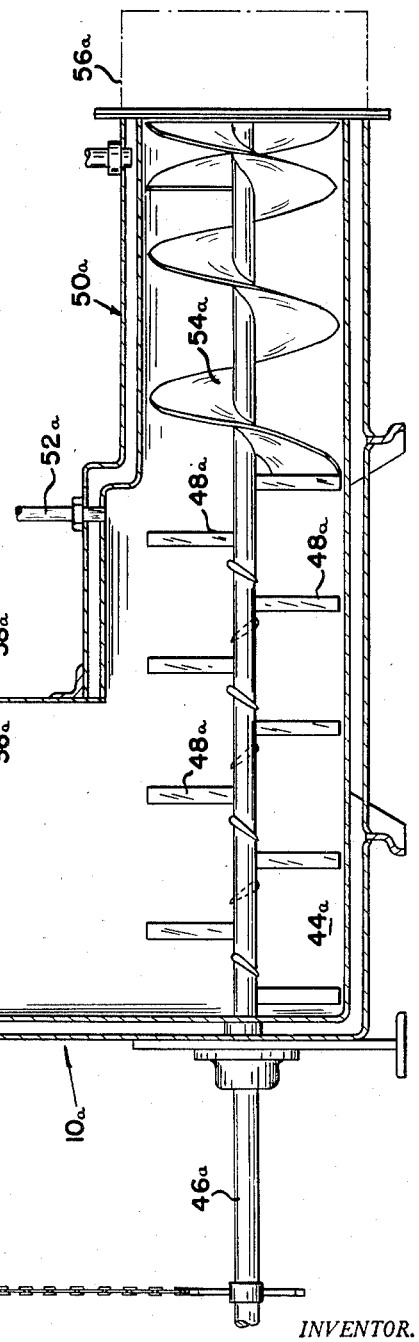

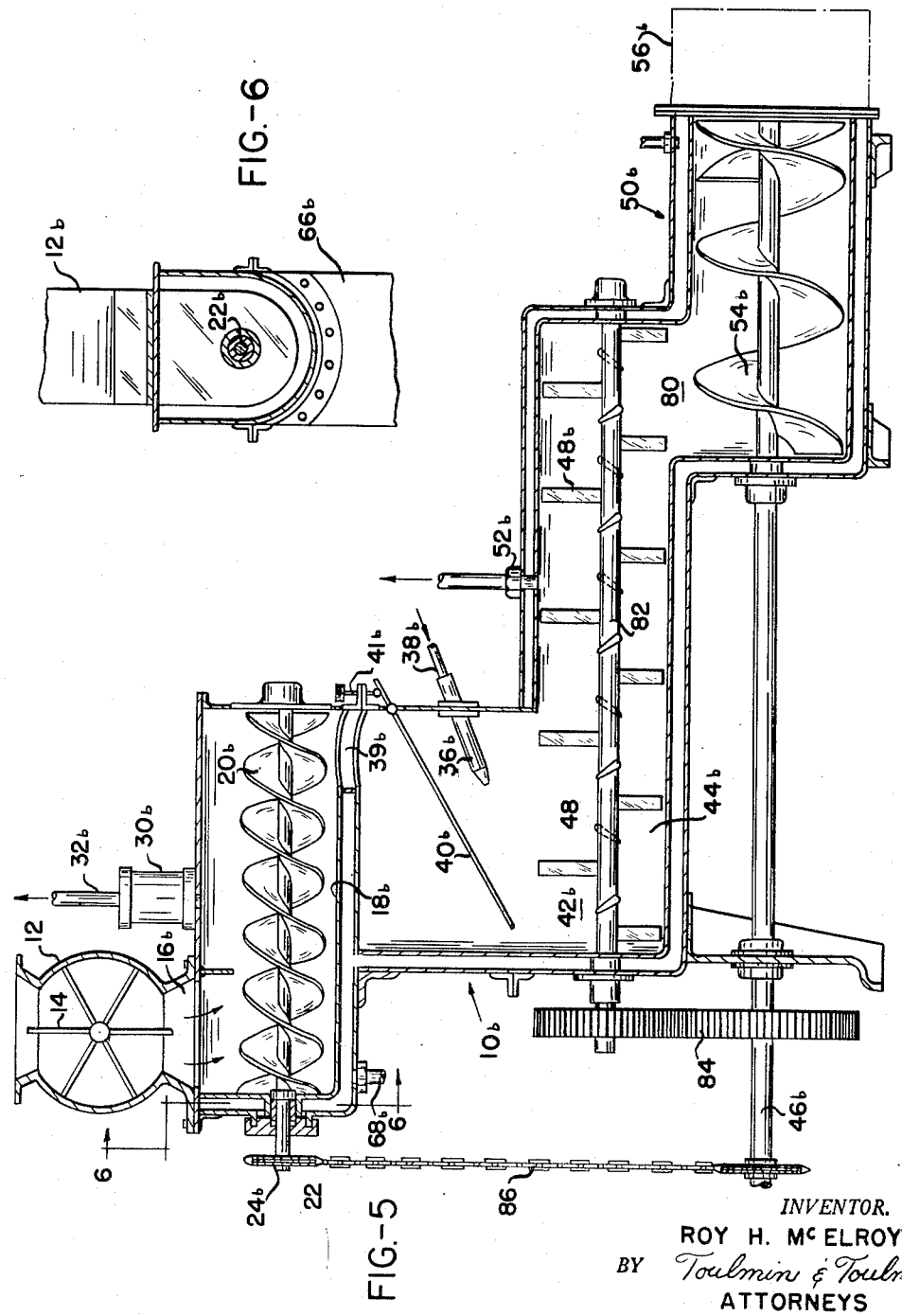

United States Patent Office 2,785,455
Patented Mar. 19, 1957

2,785,455
APPARATUS FOR WORKING CLAY-LIKE MATERIALS

Roy H. McElroy, Dayton, Ohio, assignor, by mesne assignments, to International Clay Machinery of Delaware, Inc., Dayton, Ohio, a corporation of Delaware Application April 7, 1953, Serial No. 347,226

6 Claims. (Cl. 25—14)

This invention relates to a method and apparatus for working clay-like materials, particularly clay, and most particularly to a method and apparatus for effecting the complete working and treatment of such materials, commencing with the material in a dry pulverulent state, and completing the operation when the material is extruded in a form ready for baking.

In the working of clay materials it is customary to temper the materials by the addition of water or other tempering fluids that may be employed prior to the pugging of the material, and then to pug the material in the atmosphere. The material is then further pugged and comminuted in a vacuum in order to extract the air therefrom, and then finally is extruded from the machine into molds or through a die.

One particular difficulty that arises in the working of clay-like materials in this manner is that, after the tempering fluids have been added to the pulverulent material to form the slip in the pugging mill, the material becomes extremely viscous and it is very easy for there to be air pockets formed from which the air is not evacuated thus leading to blisters in the completed article which seriously detract from its value and, at least in the case of high quality products, cause it to become scrap.

In the working of clay-like materials in this manner it is also necessary to effect an air-tight seal between the pugging mill and the vacuum chamber, and this is generally done by forming a plug of the slip passing from the discharge end of the pug mill into the vacuum chamber and, while this manner of forming a seal is effective, it nevertheless requires a great deal of power which is essentially wasted.

Having the foregoing in mind, it is a primary object of the present invention to provide a method and apparatus for working clay-like materials in which a minimum of power is required for operating the machine and working the material, and in which an improved result is obtained.

Still another object is the provision of an arrangement whereby the clay-like materials can be evacuated prior to the addition of the tempering fluids thereto whereby an extremely intimate contracting of the materials by the tempering fluids is had.

A particular object of this invention is the provision of a method and apparatus for working clay-like materials in which the materials are formed into pellets substantially immediately after they come into contact with the tempering fluids whereby the individual pellets are sealed against the inclusion of any air, and can thus be pugged into very dense, uniform and air-free slips for delivery to the extrusion auger.

A still further object of this invention is the provision of a method and apparatus for working clay-like materials in which the said material throughout the operating thereof, from the time it is delivered to the machine in a pulverulent state until it is expelled from the machine at the discharge end of the extrusion auger, is exposed to controlled heat for the heat treatment thereof.

Another particular object of this invention is the provision of an improved means for evacuating the material being worked during its travel through the machine whereby a highly efficient degree of air extrusion obtains.

These and other objects and advantages of this invention will become more apparent upon reference to the following specification taken in connection with the accompanying drawings, in which:

Figure 1 is a vertical sectional view showing one form which a machine can take adapted for working and extruding material according to my invention;

Figure 2 is a fragmentary view indicated at line 2—2 on Figure 1;

Figure 3 is a view similar to Figure 1 which shows a modified arrangement, including a rotating distributor paddle wheel;

Figure 4 is a transverse cross sectional view indicated at line 4—4 on Figure 3;

Figure 5 is a vertical sectional view similar to Figures 1 and 3 showing a still further modified arrangement characterized in that means are provided for the prolonged pugging of the material before it is delivered to the extrusion auger; and Figure 6 is a cross sectional view indicated at line 6—6 on Figure 5.

Referring to the drawings somewhat more in detail, the machine illustrated in Figures 1 and 2 comprises a frame 10, at the upper left hand side of which is a feed chute 12 in which is mounted a rotatable feed wheel 14. The upper open end of feed chute 12 may be connected with a hopper or any other suitable supply means for delivering dry pulverulent clay-like material thereto, this material preferably previously having been screened so as to be of relatively uniform size. The feed wheel 14 not only measures and feeds the material from feed chute 12 downwardly through the open bottom end 16 thereof, but also maintains an effective air seal in feed chute 12.

Immediately below feed chute 12 is a transversely extending feed cylinder 18 in which is mounted a feed screw 20 driven by shaft 22 having a sprocket 24 on the outer end thereof. Cylinder 18 is formed to a more or less troughlike shape and is substantially rectangular above the center line of shaft 22 in the manner illustrated at 26 in Figure 2. The purpose of the described arrangement of the feed cylinder and the feed screw is to assist in the evacuation of the dry pulverulent material that is delivered to the feed cylinder.

Intermediate the ends of the feed cylinder 18, at the top thereof, is an enlarged pipe 30 having a vacuum connection 32 at its upper end. This arrangement serves for the evacuating of the dry pulverulent material so that when the material is discharged from the open right end of feed cylinder 18 into tempering chamber 34 it is practically void of any air that was delivered to the feed cylinder therewith. Inasmuch as the vacuum connection 32 is directly over a portion of the travel of the material, where the material is agitated and in motion, pipe 30 is provided which gives any of the material, which rises with the air being withdrawn, an opportunity to separate from the air and fall back into the feed cylinder.

Within tempering chamber 34, at the right side thereof, are located a plurality of spray nozzles 36 fed by conduits 38. The nozzles 36 supply to the tempering chamber a fine spray or mist of the tempering fluids, generally water which is directed toward the lower end of an inclined plate down which the dry material slides.

The material discharged from the opening 39 at the right end of the feed cylinder falls on an inclined panel or plate 40 and rolls down the plate to the lower left end thereof so as to fall through the opening 42 into the pug mill. The material, in rolling down inclined plate 40, distributes itself into a thin layer and falls from the plate in a thin broad sheet. The material which is delivered to the pug mill is thus uniformly admixed with water from the spray nozzles and is also free of air. The angle of plate 40, and thus the character of the sheet of material against which the fine spray from nozzles 36 impinges, can be adjusted by the adjustment of screw 41.

The supply of fluids to the nozzles 36 can readily be controlled by valve means in the conduits 38 so that a predetermined ratio can be maintained between the amount of dry material being fed through the machine and the amount of tempering fluids that are added thereto, thereby to produce an end product having the proper characteristics.

The extreme lower part of the tempering chamber 34 below inclined plate 40 forms the pug mill section 44 through which extends a shaft 46 on which are mounted the inclined pugging knives 48 that masticate the material that falls through opening 42 and advances it rightwardly toward the entrance end of the extrusion section 50 of the machine. An additional vacuum connection can be provided at 52 above the pug mill and beneath inclined plate 40 as indicated at the right side.

Shaft 46 extends through the extrusion cylinder of the extrusion section and therein carries the extrusion auger 54 which serves to advance the now completely air and void-free and tempered material rightwardly and out the right end of the extrusion cylinder through a die or into a mold indicated by the dot-dash outline 56.

Shaft 46 is preferably driven by an electric motor or the like and the driving of this shaft provides power for rotation of shaft 22 by means of chain 64 passing over sprocket 24 on shaft 22 and also passing over a sprocket on shaft 46.

According to one form which my invention can take, substantially the entire machine is provided with a jacket 66 through which a heating medium is passed by means of the inlet and outlet connections indicated at 68. This heating medium can comprise a heated gas such as hot air, or steam can be employed, either live or super-heated. In certain instances a hot liquid such as oil can be employed, but in most instances hot air or steam will suffice in providing the desired heat treatment of the clay-like material.

According to another modification of my invention (not illustrated), steam can be employed as the heating medium and the condensate from the steam, or a portion thereof, is employed for supplying the jets 36, whereby a certain economy of operation will result in the installation, and operation of the machine will be somewhat simplified.

Turning now to Figures 3 and 4, a substantially identical structure is illustrated as the one just described and, accordingly, corresponding reference numerals have been applied with the addition of subscript "a." The essential difference between the modification of Figure 3 and that of Figure 1 is that at the exit end of feed cylinder 18a in Figure 3 there is provided a multi-bladed paddle wheel 70 mounted on the lower end of a vertically extending shaft 72 driven by a belt 74. The paddle wheel 70 rotates continuously during operation of the machine and serves to scatter the material about within the tempering chamber 34a, whereby an extremely intimate admixture of the material and the spray issuing from the jets 36a is obtained, thus leading to extremely rapid and and effective tempering of the clay-like material whereby the highest speed of operation of the machine will be accompanied by a proper treatment of the material.

Turning now to Figures 5 and 6, there is shown therein a still further modification of my invention which is similar to that shown and described in Figures 1 and 3, with the exception of certain constructional differences. The reference numerals apply to Figures 5 and 6 to those parts corresponding to parts of Figure 1 which carry the same reference numerals with the addition of subscripe "b." In Figure 5 the most important difference exists in the location and arrangement of the pug mill section 44b. In Figure 5 the pug mill section is elongated over what it is in Figures 1 and 3 and is located above the extrusion section 50b, with the discharge from the pug mill section being from the bottom at the right end thereof and the entrance end of extrusion section being at the top and at the left end thereof, the vertical channel 80 being provided to convey the material from the pug mill to the extrusion auger.

In Figure 5 the pug mill has its own shaft 82 connected for being driven by shaft 46b by gear means 84, while the means 86 drives shaft 22b of the feed section of the machine.

In all of the modifications illustrated the features obtain of evacuating the dry material, the spraying thereon of the tempering fluids, the rolling of the moistened material down an inclined plate to the entrance end of the pug mill and the pugging of the tempered material simultaneously with the evacuation thereof, the foregoing continuous and integrated cycle of operations taking place either with or without there being a supply of heating medium surrounding the machine.

It will be understood that this invention is susceptible to modification in order to adapt it to different usages and conditions, and, accordingly, it is desired to comprehend such modifications within this invention as may fall within the scope of the appended claims.

I claim:

1. In a machine for working pulverulent clay-like materials, a frame, a horizontally disposed feed cylinder mounted in said frame and having means for feeding the materials longitudinally therethrough to one end thereof, a closed tempering chamber mounted beneath said feed cylinder and communicating therewith adjacent to said one end thereof, an inclined plate within said tempering chamber having its upper end pivotally mounted on that portion of the tempering chamber adjacent to the discharge end of said feed cylinder, said plate being inclined downwardly so as to direct the materials dropped thereon in a direction opposite to that of the movement of material in the feed cylinder and to cause the material to flow from the lower end of said cylinder, a plurality of horizontally disposed nozzles mounted in the wall of the tempering chamber beneath the pivotal connection of the inclined plate for directing a spray of tempering fluid in the path of said thin curtain of material as it leaves the lower end of said inclined plate, a pug mill beneath said tempering chamber and communicating therewith to receive the material from said inclined plate immediately after said material is exposed to the tempering fluid, an extrusion cylinder extending from said pug mill to receive material therefrom, and means for evacuating gases from said tempering chamber to permit air and void-free material to be pugged and subsequently extruded.

2. In a machine for working pulverulent clay materials, as claimed in claim 1, with means mounted exteriorly of said tempering chamber for adjusting the inclination of said plate.

3. In a machine for working pulverulent clay materials, a frame, a horizontally disposed feed cylinder mounted in said frame and having means for feeding the material longitudinally therethrough to one end thereof, a closed tempering chamber mounted beneath said feed cylinder and communicating therewith adjacent to said one end thereof, an inclined plate within said tempering chamber having its upper end pivotally mounted on that portion of the tempering chamber adjacent to the discharge end of said feed cylinder, said plate being inclined downwardly so as to direct the material dropped thereon in a direction opposite to that of the movement of material in the feed cylinder and to cause the material to flow from the lower end of said plate in a thin sheet, a plurality of horizontally disposed nozzles mounted in the wall of the tempering chamber beneath the pivotal connection of the inclined plate, said nozzles being directed at the lower end of said inclined plate so as to form a spray of tempering fluid immediately beneath said lower end to wet said material while it is still in a thin sheet and before the sheet is dispersed as it falls downwardly, a pug mill beneath said tempering chamber and communicating therewith to receive the material from said inclined plate immediately after said material is exposed to the tempering fluid, an extrusion cylinder extending from said pug mill to receive material therefrom, and means for evacuating gases from said tempering chamber to permit air and void-free material to be pugged and subsequently extruded.

4. In a machine for working pulverulent clay-like materials, a frame, a horizontally disposed feed cylinder mounted in said frame and having means for feeding the materials longitudinally therethrough to one end thereof, a closed tempering chamber mounted beneath said feed cylinder and communicating therewith adjacent to said one end thereof, an inclined plate within said tempering chamber having its upper end pivotally mounted on that portion of the tempering chamber adjacent to the discharge end of said feed cylinder and spaced downwardly a substantial distance from the feed cylinder to permit any clusters of material discharged from said feed cylinder to break apart upon contacting said inclined plate, said plate being inclined downwardly so as to direct the material dropped thereon in a direction opposite to that of the movement of the material in the feed cylinder and to cause the material to flow from the lower end of said plate in a thin sheet, a plurality of horizontally disposed nozzles mounted in the wall of the tempering chamber beneath the pivotal connection of the inclined plate for directing a spray of tempering fluid in the path of said thin curtain of material as it leaves the lower end of said inclined plate, a pug mill beneath said tempering chamber and communicating therewith to receive the material from said inclined plate immediately after said material is exposed to the tempering fluid, an extrusion cylinder extending from said pug mill to receive material therefrom, and means for evacuating gases from said tempering chamber to permit air and void-free material to be pugged and subsequently extruded.

5. In a machine for working pulverulent clay-like materials, a frame, a horizontally disposed feed cylinder mounted in said frame and having means for feeding the material longitudinally therethrough to one end thereof, a closed tempering chamber mounted beneath said feed cylinder and communicating therewith adjacent to said one end thereof, an inclined plate within said tempering chamber having its upper end pivotally mounted on that portion of the tempering chamber adjacent to the discharge end of the feed cylinder and spaced downwardly a substantial distance from said feed cylinder to permit any clusters of material to discharge from said feed cylinder to break apart upon contacting said inclined plate, said plate being inclined downwardly so as to direct the materials dropped thereon in a direction opposite to that of the movement of material in the feed cylinder and to cause the material to flow from the lower end of said plate in a thin sheet, means mounted on the exterior of said tempering chamber for adjusting the inclination of said plate, a plurality of horizontally disposed nozzles mounted in the walls of the tempering chamber beneath the pivotal connection of the inclined plate, said nozzles directed to the lower end of the said inclined plate so as to form a spray of tempering fluid immediately beneath said lower end to wet said material while it is still in a thin sheet and before the sheet is dispersed as it falls downward, a pug mill beneath said tempering chamber and communicating therewith to receive the material from said inclined plate immediately after said material is exposed to the tempering fluid, an extrusion cylinder extending from said pug mill to receive material therefrom, and a vacuum connection to said tempering chamber for evacuating gases therefrom to permit air and void-free material to be pugged and subsequently extruded.

6. In a machine for working pulverulent clay-like materials, a frame, a horizontal feed trough in the frame, feed means opening into said trough at one end thereof for feeding the materials into the trough while maintaining the trough sealed, a feed screw extending lengthwise of the trough for moving the material from the said one end of the trough to the other end thereof, there being a discharge operating at said other end of said feed trough, there being a vacuum connection on said feed trough to evacuate air and gases from the clay-like material being fed therethrough, a closed tempering chamber mounted beneath said feed trough and communicating therewith through said discharge opening, an inclined plate within said tempering chamber beneath said discharge opening with said plate being inclined downwardly so as to direct the materials dropped thereon in a direction opposite to that of the movement of material by the feed screw and to cause the material to flow from the lower end of said inclined plate, a plurality of spray nozzles mounted in said tempering chamber beneath the connection of the inclined plate for directing a spray of tempering fluid in the path of said thin curtain of material as it leaves the lower end of said inclined plate, a pug mill beneath said tempering chamber and communicating therewith to receive the material from said inclined plate immediately after said material is exposed to said tempering fluid, an extrusion cylinder extending from said pug mill to receive material therefrom, and means for evacuating gases from said tempering chamber to permit air and void-free material to be pugged and subsequently extruded.

References Cited in the file of this patent

UNITED STATES PATENTS

| 475,915 | Arnold | May 31, 1892 |
| 598,282 | Carmichael | Feb. 1, 1898 |
| 1,877,138 | Lee et al. | Sept. 13, 1932 |
| 1,987,359 | Brown | Jan. 8, 1935 |
| 2,063,266 | Paper et al. | Dec. 8, 1936 |
| 2,642,643 | Montague | June 23, 1953 |

FOREIGN PATENTS

| 36,676 | Netherlands | Oct. 15, 1935 |
| 412,248 | Great Britain | June 25, 1934 |
| 657,758 | Germany | Mar. 12, 1938 |
| 664,650 | Germany | Sept. 15, 1938 |
| 941,360 | France | July 12, 1948 |